Figure 5:
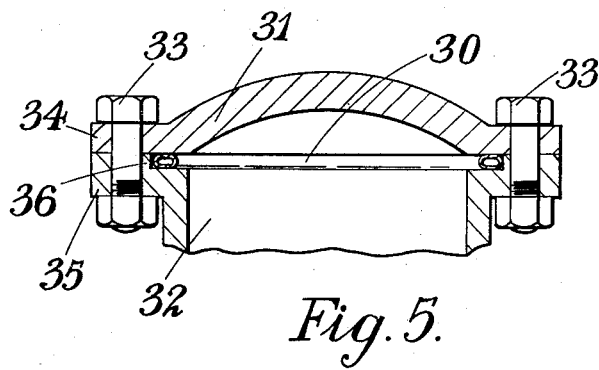

Jan. 10, 1961 P. WILLS 2,967,727
GASKETS AND LIKE JOINT RINGS
Filed Feb. 14, 1952 2 Sheets-Sheet 1
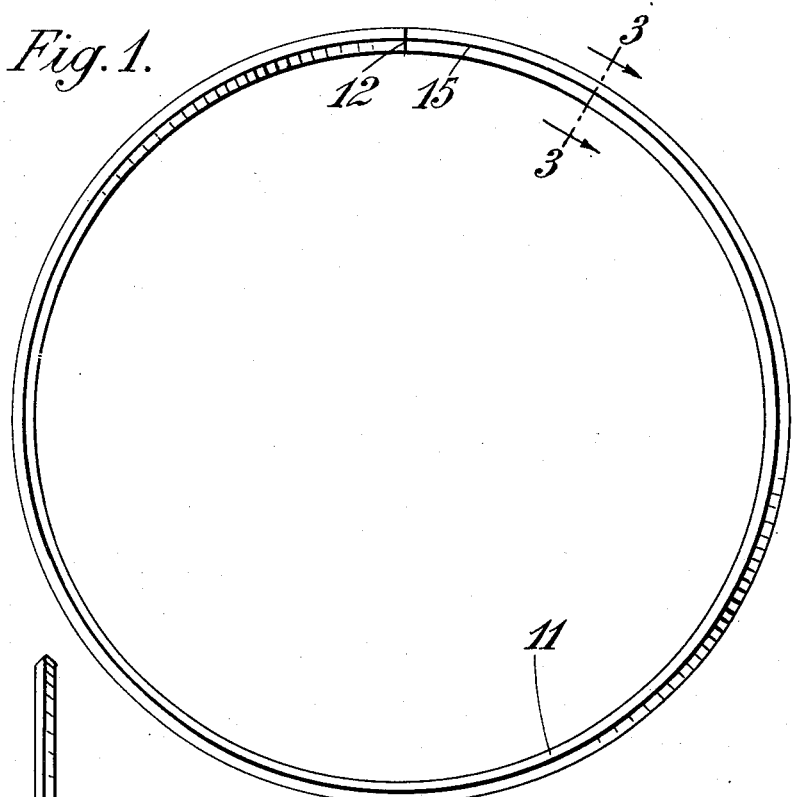
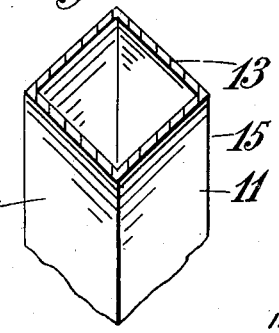
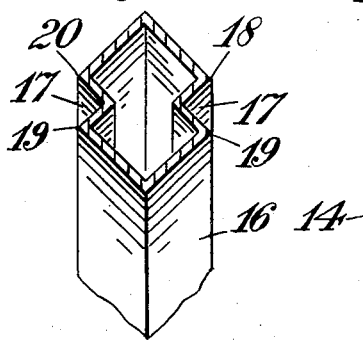
INVENTOR:
Percy Wills Jan. 10, 1961   P. WILLS   2,967,727
GASKETS AND LIKE JOINT RINGS
Filed Feb. 14, 1952   2 Sheets-Sheet 2

INVENTOR:
Percy Wills

United States Patent Office 2,967,727
Patented Jan. 10, 1961

2,967,727

GASKETS AND LIKE JOINT RINGS

Percy Wills, Bridgwater, England, assignor to Wills Pressure Filled Joint Ring, Limited, Bridgwater, England, a British company Filed Feb. 14, 1952, Ser. No. 271,567

Claims priority, application Great Britain Sept. 8, 1950

1 Claim. (Cl. 288—20)

This invention comprises improvements in or relating to gaskets and like joint rings. The present application is a continuation in part of the application of U.S. Serial No. 192,661, filed October 28, 1950, now abandoned.

It is an object of the invention to provide an improved joint ring or gasket of the type described in prior U.S. patent specification No. 1,917,175.

According to the said specification gaskets or joint rings are formed by making them of soft metal and hollow, the hollow space being filled with a fluid under pressure which may be, for example, of the order of three hundred pounds per square inch or more. If air pressure at three hundred pounds per square inch is sealed in a hollow metal ring, for example a ring made of a soft copper tube with a thinnish section, the effect is to make it easier to obtain a fluid-tight joint when such a ring is used as a gasket between flanges. When the ring is distorted by pressure between the flanges it conforms itself to any irregularities in the metallic surfaces, and on release of the pressure between the flanges, if the joint has to be broken, the ring tends to regain its original shape. In other words, the advantages of a soft metal ring which is yielding are combined with a certain degree of resiliency.

The present invention is concerned with improvements in the said rings or gaskets and in the process of their manufacture.

In the main specification the rings were stated to be filled with air under pressure by sealing them up while contained in a pressure chamber; alternatively chemicals could be introduced which would react on heating and yield gas under pressure. Neither method of manufacture is satisfactory. The first method is clumsy and involves apparatus which is difficult to use; the second method produces by-products which may react with the material of the tube itself and also necessitates taking steps to keeps the ingredients apart until reaction is desired, as for example by enclosing one of both of the reactants in wax, which can be melted off when a reaction is to be provoked. The present invention contemplates, among other steps, the use of sodium azide as a gas-yielding substance within the tube. A tube containing a minute amount of sodium azide is prepared, bent into a circle or other looped form and welded into a ring. The azide decomposes under heat, yielding a nitrogen-filled ring, the pressure of which may be as high as desired according to the amount introduced. The invention includes a nitrogen-filled ring and furthermore includes the employment of such a ring which is of non-circular section and the walls of which are sufficiently thin to be deformed by the pressure within, the ring being of a smaller dimension in a direction at right angles to the plane of the ring than in the plane of the ring. The metals employed for the manufacture of gaskets or rings according to this invention include not only copper but also mild steel, stainless steel, cupro nickel and Monel metal.

Figure 6:
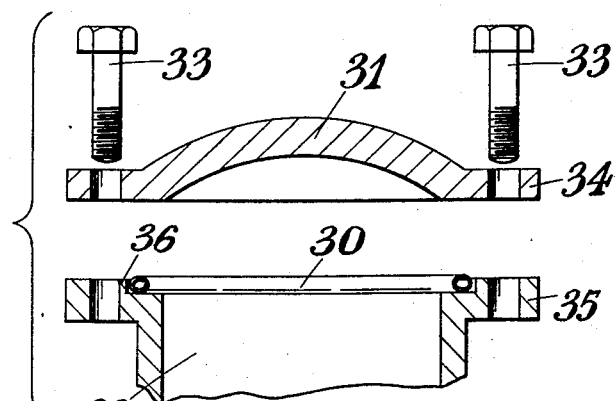

The following is a description by way of example of certain constructions in accordance with the invention, reference being made to the accompanying drawing in which:

Figure 1 is a plan of one form of ring;
Figure 2 is an edge view;
Figure 3 is a section upon the line 3—3 of Figure 1 to an enlarged scale;
Figure 4 is a view similar to Figure 3 of one possible alternative construction;
Figure 5 is a view in cross-section of a further form of ring in accordance with the invention when clamped in a joint; and
Figure 6 shows the same ring when released from the pressure of the joint.

The ring 11 shown in Figures 1 to 3 is made by taking a stainless steel ring in the form of a tube of square section and bending it in the form of a circle. A suitable quantity of sodium azide ($NaN_3$) is then introduced into the tube after which the ends are welded together as shown at 12.

It is to be noted that the tube has a relatively thin section of wall as can be seen at 13, Figure 3. The joint at 12 is smoothed off after being electrically welded so that the exterior of the ring presents a uniform surface everywhere and particularly so that the material shows a continuous even line along the edges 15 throughout the circumference of the gasket. This is important so as to ensure that the edges 14, 15, which afford the sealing surface of the joint ring, are able to make close contact with the surfaces between which they are placed when in use.

The whole ring is next heated to a temperature of 350° C. which is sufficient to decompose the sodium azide and generate nitrogen under pressure within the ring. Assuming, for example, that the ring 11 is two inches outside diameter and that the section of the tube of which this is made is one eighth of an inch wide across the flats and that the wall hickness is 0.020 inch, 45 milligrams of sodium azide are sufficient to produce an internal pressure of 600 pounds per square inch, which is suitable in the case of stainless steel.

If a similar ring is made of copper a pressure of 300–350 pounds per square inch is sufficient and 26 milligrams of sodium azide would be employed.

A copper ring, instead of being electrically welded at the joint, is silver soldered. Alternatively, Monel metal or cupro nickel can be employed and these metals can be electrically welded.

It will be understood that while a circular ring is shown in the drawing any desired outline such as an oval or an irregular outline can be employed. Moreover, the section of the ring need not be square. For example, it may be as shown in Figure 4 in which the ring 16 is of diamond section with a groove 17 along each face leading to ridges 18, 19 around one face of the ring and to ridges 19, 20 around the other face. Larger sizes of ring require proportionately more sodium azide. Other substances capable of generating gas by decomposition on heating can be employed, for example ammonium nitrate.

Referring to Figure 5, this shows a joint complete with a joint ring 30. In the figure the two members 31, 32 of the joint are shown held together by bolts 33 which pass through flanges 34, 35 on the members 31, 32. The flange 35 is recessed to receive the joint ring 30 and the external diameter of the joint ring 30 is made a few thousandths of an inch smaller than the internal diameter of the flange 35 at the recess 36. The depth of the recess in an axial direction is made at least 5 to 10 thousandths of an inch smaller than the dimension in an axial direction of the ring 30. Consequently, when the joint is drawn up by tightening the bolts 33, the ring 30 is compressed axially and expanded radially so that it touches both the joint faces and also the wall of the recess 36. The ring 30 is thus held in a non-circular shape as viewed in cross-section. It is made of stainless steel or copper or other non-corrodible metal by the same process as that already described for the rings of Figures 1 to 4, and therefore contains nitrogen under pressure, a suitable pressure being 600 pounds per square inch. Pressure within the members 31, 32 of the joint serves only to ensure that the pressure with which the joint ring 30 bears against the members 31, 32 increases. An increase of temperature raises the pressure of the gas within the ring and makes the joint tighter still. Therefore a joint so fitted is particularly suitable for use with high pressure and high temperatures, such for example as are encountered in the casings of internal combustion turbines and in other situations demanding high duty.

If the ring shown in Figure 5 is released from the joint-pressure by unscrewing the bolts 33 it will partially recover its shape as indicated in Figure 6. This is due to the ring being of a non-circular section in the joint so that when the joint-pressure is released the gas pressure within it tends to accord resilience to the ring. Consequently, the ring can be used when making a fresh joint.

Conveniently, rings such as those illustrated in Figures 5 and 6 can be manufactured from tube which is initially of circular cross-section, and after the sodium azide or like chemical for producing nitrogen pressure has been introduced into them and the joint welded and cleaned off and the gas pressure produced therein by heating, the rings are compressed in an axial direction so as to render the cross-section oval before compression as shown in Figure 6.

It will be appreciated that it is important that the pressure within the gasket and the thickness of the walls should be so related to each other and to the elasticity of the material employed for the manufacture of the gasket that the gasket retains the pointed or ridge-shaped sealing edges when the pressure is generated therein, and that nevertheless it should be able to yield a little so that the walls bulge under the pressure. With the materials mentioned pressure of the order stated and wall thickness of the order indicated give this result. While widely varying pressures can be employed with success, the wall thickness of the tubes being generally greater or their internal diameters smaller with higher pressures, the practical range which it is preferred to keep within and which yields the best results lies between 100 pounds per square inch and 1400 pounds per square inch. For gaskets which are intended for use in cold places, as in the joints of refrigerators, it is desirable to employ high pressures, and for gaskets which are used in the joints of pipes which are hot it is desirable to use lower pressures, allowance being made for the contraction or expansion of the gas under cold or heat and for the weakening of the material of the gasket under substantial heats.

It will be noted that in the example illustrated the internal shape of the tube is non-circular, and follows closely the outline of the external shape, that is to say the wall thickness is substantially the same at all points.

I claim:

A joint comprising two members to be jointed together having plane opposed joint faces, a gasket between said joint faces consisting of a smooth endless tube of metal filled with gas under a pressure of between 100 to 1400 pounds per square inch, the walls of which tube are under an initial stress due to permanent set in a plane at right angles to the plane of the gasket, means for drawing the joint faces together to clamp the gasket and limit means positively spacing the opposed joint faces apart a distance greater than the elastic limit of the gasket walls whereby the faces are unable to compress the gasket sufficiently to produce further permanent set.

References Cited in the file of this patent

UNITED STATES PATENTS

| | | |
|---|---|---|
| 685,610 | Huhn | Oct. 29, 1901 |
| 1,043,065 | Cash | Nov. 5, 1912 |
| 1,207,813 | Stockton | Dec. 12, 1916 |
| 1,875,148 | Reid | Aug. 30, 1932 |
| 1,917,175 | Wills et al. | July 4, 1933 |
| 2,345,515 | Tweedale | Mar. 28, 1944 |
| 2,467,061 | Mason | Apr. 12, 1949 |

FOREIGN PATENTS

| | | |
|---|---|---|
| 380,853 | Great Britain | Sept. 29, 1932 |
| 474,238 | Great Britain | Oct. 27, 1937 |
| 489,053 | Great Britain | July 19, 1938 |
| 566,125 | Great Britain | Dec. 14, 1944 |

OTHER REFERENCES

"Comprehensive Treatise on Inorganic and Theoretical Chemistry," by Mellor, published in 1928, volume 8, page 345.